United States Patent
Sakashita

(10) Patent No.: US 7,535,455 B2
(45) Date of Patent: May 19, 2009

(54) DISPLAY APPARATUS, CONTROL METHOD THEREFOR, AND CONTROL PROGRAM FOR IMPLEMENTING THE CONTROL METHOD

(75) Inventor: Yukihiko Sakashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 11/086,477

(22) Filed: Mar. 22, 2005

(65) Prior Publication Data
US 2005/0219269 A1    Oct. 6, 2005

(30) Foreign Application Priority Data
Mar. 22, 2004   (JP)   ............... 2004-083351

(51) Int. Cl.
*G09G 5/00*    (2006.01)
(52) U.S. Cl. .................. 345/156; 345/698; 345/173
(58) Field of Classification Search ............... 345/156, 345/173–184, 698, 699, 3.4
See application file for complete search history.

(56) References Cited
U.S. PATENT DOCUMENTS

| | | | | |
|---|---|---|---|---|
| 5,881,169 | A * | 3/1999 | Henry, Jr. .................. | 382/187 |
| 6,683,604 | B1 * | 1/2004 | West et al. ................. | 345/204 |
| 7,106,311 | B2 * | 9/2006 | Tsang ........................ | 345/178 |
| 7,268,772 | B2 * | 9/2007 | Kawai et al. ............... | 345/173 |
| 7,289,113 | B2 * | 10/2007 | Martin ....................... | 345/178 |

FOREIGN PATENT DOCUMENTS

| | | |
|---|---|---|
| JP | 5-204374 A | 8/1993 |
| JP | 5-274442 A | 10/1993 |
| JP | 6-139234 A | 5/1994 |
| JP | 11-85132 A | 3/1999 |
| JP | 11-175245 A | 7/1999 |

* cited by examiner

*Primary Examiner*—Duc Q Dinh
(74) *Attorney, Agent, or Firm*—Rossi, Kimms & McDowell, LLP

(57) ABSTRACT

A display apparatus which does not cause an erroneous operation of a PC connected to the display apparatus even when operations for realizing various functions on the display apparatus are carried out using an indicating device such as a digitizer, enables the operation of the connected PC at the same time, and enables the operation of the display apparatus and the operation of the PC using a single indicating device without giving a feeling of incompatibility to a user. Resolution of the received image signal is changed and the resulting image is output. Switching on the output image is carried out and an image after the switching is displayed on a display screen. An indication signal containing position coordinates on the display screen and at least one type of indication command are generated according to an indication carried out on the displayed image. The indication signal is converted according to the position coordinates contained in the indication signal, and the converted indication signal is output to the image output apparatus.

20 Claims, 11 Drawing Sheets

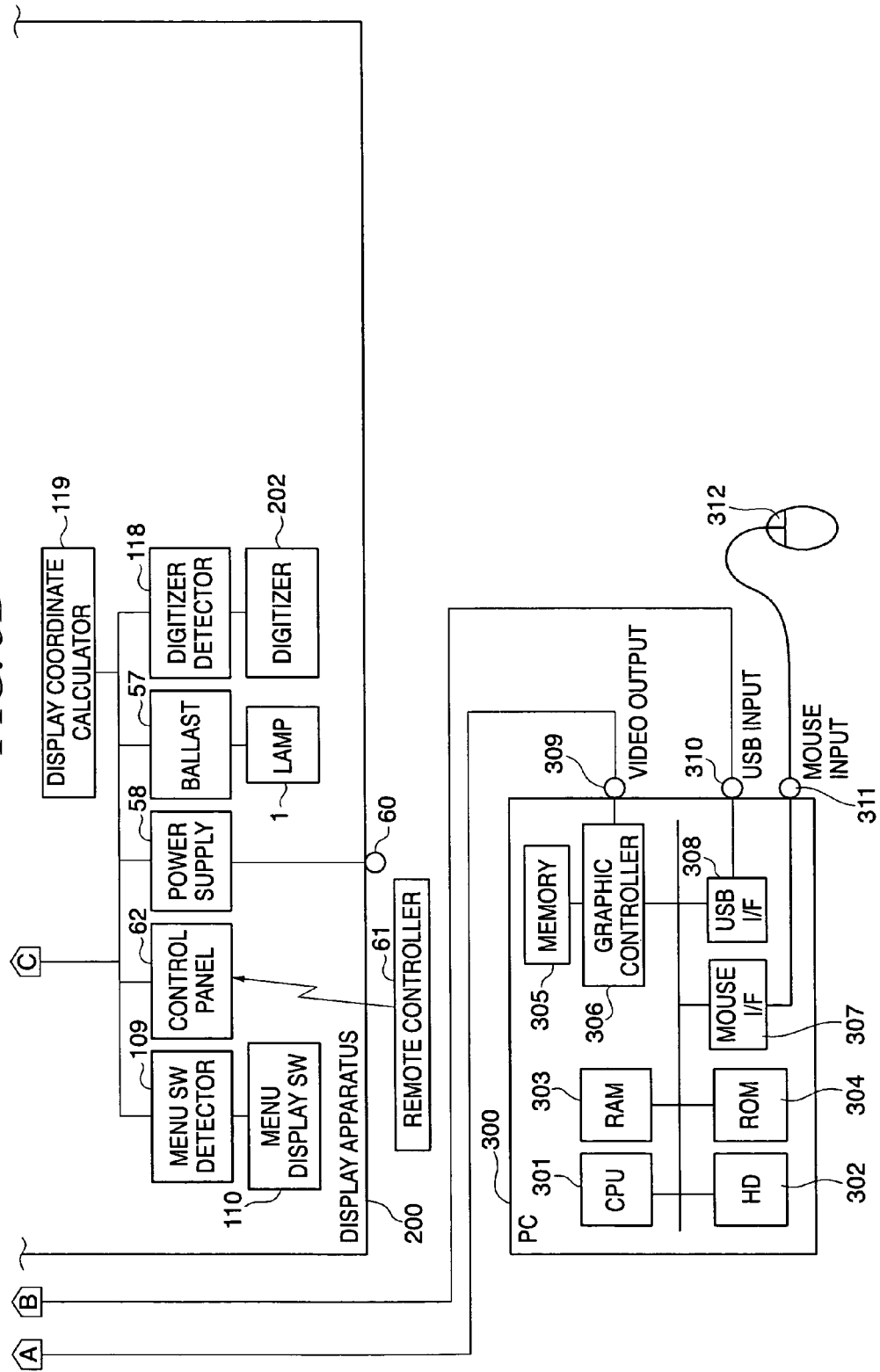

DISTANCE "a" FROM P1

DISTANCE "a" FROM P1

DISPLAY APPARATUS, CONTROL METHOD THEREFOR, AND CONTROL PROGRAM FOR IMPLEMENTING THE CONTROL METHOD

BACKGROUND OF THE INVENTION

1. Field of the Invention

The present invention relates to a display apparatus which receives an image signal output from an image output apparatus such as a personal computer, and displays an image at a predetermined resolution, a control method for the display apparatus, and a control program for implementing the control method.

2. Description of the Related Art

In a conventional display apparatus which displays images output from an image output apparatus such as a personal computer (simply referred to as PC hereinafter) connected thereto, a digitizer such as a touch panel is attached on a display screen, and the digitizer is used as an indicating device for the connected PC. With this configuration, it is necessary to transmit coordinates acquired by the digitizer to the PC (refer to Japanese Laid-Open Patent Publication (Kokai) No. H11-175245).

When the display apparatus is used to simply display images from the PC, the indication processing can be carried out without trouble merely by transmitting the coordinates acquired by the digitizer to the PC. However, when the display apparatus is used to provide various functions, and operations for these functions are carried out by the digitizer, the PC can be operated incorrectly unless control is provided for the coordinates to be transmitted to the PC.

Further, when functions such as zooming and panning of images input from the PC to the display apparatus are performed on the display apparatus, and a position is indicated on the display screen of the display apparatus by the digitizer to give an instruction to the display apparatus or the PC, the instructed object can erroneously operate in response to the instruction, or an image which is indicated can be displayed at an incorrect position, giving a feeling of incompatibility to the user.

SUMMARY OF THE INVENTION

It is a first object of the present invention to provide a display apparatus and a control method for the display apparatus which do not cause an erroneous operation of a PC connected to the display apparatus even when operations for realizing various functions on the display apparatus are carried out using an indicating device such as a digitizer, enable the operation of the connected PC at the same time, and enable smooth operations of the display apparatus and the PC using a single indicating device without giving a feeling of incompatibility to a user, and a control program for implementing the control method.

It is a second object of the present invention to provide a display apparatus and a control method for the display apparatus which enable a smooth operation by a user without being aware of an object to be instructed when functions such as zooming and panning of images input from a PC to the display apparatus are performed on the display apparatus, and a position is indicated on the display screen of the display apparatus by an indicating device such as a digitizer to give an instruction to the display apparatus or the PC, and a control program implementing the control method.

To attain the above object, in a first aspect of the present invention, there is provided a display apparatus that receives an image signal from an image output apparatus, and displays an image at a predetermined resolution comprising a display device that changes resolution of the received image signal and outputs a resulting image, a display switching device that carries out switching on the output image and displays an image after the switching on a display screen, an indicating device that generates an indication signal containing position coordinates on the display screen and at least one type of indication command according to an indication carried out on the displayed image, an indication signal conversion device that converts the indication signal according to the position coordinates contained in the indication signal, and an indication signal output device that outputs the converted indication signal to the image output apparatus.

Preferably, the display device comprises an image signal characteristics detecting device that detects characteristics of the image signal subjected to the resolution conversion, and the display device selects one resolution conversion method from a plurality of resolution conversion methods according to the detected characteristics of the image signal, and converts the resolution of the image signal according to the selected resolution conversion method, and the indication signal conversion device converts the position coordinates according to the selected resolution conversion method.

Preferably, the indication signal conversion device converts position information indicated by the indication signal according to the position coordinates contained in the indication signal.

Preferably, the indication signal conversion device converts a type of the indication command contained in the indication signal according to the position coordinates contained in the indication signal.

Alternatively, the indication signal conversion device converts position information indicated by the indication signal according to a type of the indication command contained in the indication signal.

Alternatively, the indication signal conversion device converts position information indicated by the indication signal according to an interpolation method used for enlargement of the displayed image.

Preferably, the indicating device comprises a display mode switching device that switches between a plurality of display modes according to the position coordinates of the output image from the display device, and the indication signal conversion device converts the indication signal according to one of the display modes selected by the switching.

More preferably, the indication signal conversion device converts a signal generated by a click as the indication signal to a pointing signal when the display mode selected by the switching is a pan mode for panning the displayed image or a zoom mode for zooming the displayed image.

Preferably, the display switching device comprises a first switching device that switches the output image to a first image, and outputs the first image, and a second switching device that switches the output first image to a second image, and outputs the second image.

To attain the above object, in a second aspect of the present invention, there is provided a control method for a display apparatus that receives an image signal from an image output apparatus, and displays an image at a predetermined resolution, comprising a display step of changing resolution of the received image signal and outputting a resulting image, a display switching step of carrying out switching on the output image and displaying an image after the switching on a display screen, an indicating step of generating an indication signal containing position coordinates on the display screen and at least one type of indication command according to an indication carried out on the displayed image, an indication signal conversion step of converting the indication signal according to the position coordinates contained in the indication signal, and an indication signal output step of outputting the converted indication signal to the image output apparatus.

To attain the above object, in a third aspect of the present invention, there is provided a computer-readable control program for implementing a control method for a display apparatus that receives an image signal from an image output apparatus, and displays an image at a predetermined resolution, comprising, a display module for changing resolution of the received image signal and outputting a resulting image, a display switching module for carrying out switching on the output image and displaying an image after the switching on a display screen, an indicating module for generating an indication signal containing position coordinates on the display screen and at least one type of indication command according to an indication carried out on the displayed image, an indication signal conversion module for converting the indication signal according to the position coordinates contained in the indication signal, and an indication signal output module for outputting the converted indication signal to the image output apparatus.

With the configuration according to the present invention, an erroneous operation of an image output apparatus connected to the display apparatus according to the present invention can be prevented even when operations for realizing various functions on the display apparatus are carried out using an indicating device such as a digitizer, the operation of the connected image output apparatus at the same time is enabled, and smooth operations of the display apparatus and the image output apparatus can be carried out using a single indicating device without giving a feeling of incompatibility to a user.

With the configuration according to the present invention, when functions such as zooming and panning of images input from an image output apparatus to the display apparatus according to the present invention are performed on the display apparatus, and a position on the display screen of the display apparatus is indicated by an indicating device such as a digitizer to give an instruction to the display apparatus or the image output apparatus, an instruction suitable for a image after converting resolution of the image can be given. Thus, an erroneous operation of the image output apparatus can be prevented, and it is possible to prevent a feeling of incompatibility to a user due to an image which is indicated being displayed at an incorrect position indicated by the indicating device, and a smooth operation by a user can be carried out without being aware of the object to be instructed.

The above and other objects, features, and advantages of the invention will become more apparent from the following detailed description taken in conjunction with the accompanying drawings.

BRIEF DESCRIPTION OF THE DRAWINGS

FIGS. 3A and 3B are block diagrams showing the configurations of the display apparatus in FIG. 1 and a PC connected to the display apparatus;

DETAILED DESCRIPTION OF THE PREFERRED EMBODIMENTS

The present invention will now be described in detail with reference to the drawings showing preferred embodiments thereof.

Figure 1:
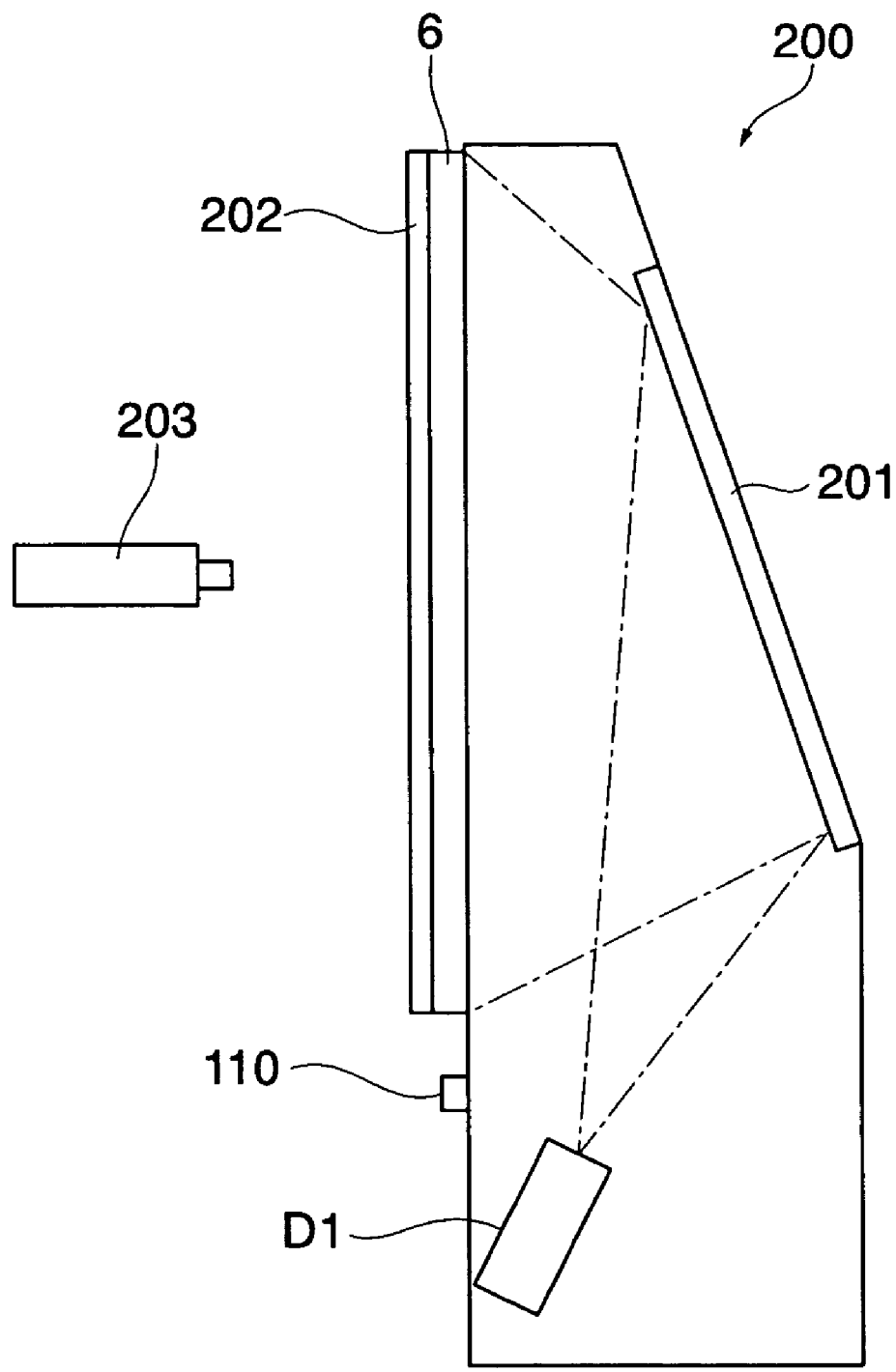
FIG. 1 is a schematic side view showing the structure of a display apparatus according to a first embodiment of the present invention.

FIG. 1 is a schematic side view showing the structure of a display apparatus according to a first embodiment of the present invention.

A rear projection display apparatus 200 as the display apparatus is comprised of a projection display engine D1, a reflective mirror 201, a screen 6, and a digitizer 202, as well as a menu display switch (SW) 110, as a switch for ON/OFF of a menu display. The switch 110 is used to input position coordinates input by a digitizer pen 203 to the rear projection display apparatus 200.

Specifically, an image projected by the projection display engine D1 is reflected by the reflective mirror 201, and is then projected from the rear side of the screen 6. The digitizer 202 is mounted on the front surface of the screen 6, and is used to input the position coordinates input by the digitizer pen 203 from the front surface of the screen 6 to the display apparatus. Digitizers of various types such as optical, pressure-sensitive, and ultrasonic types may be used as the digitizer 202.

Figure 2:
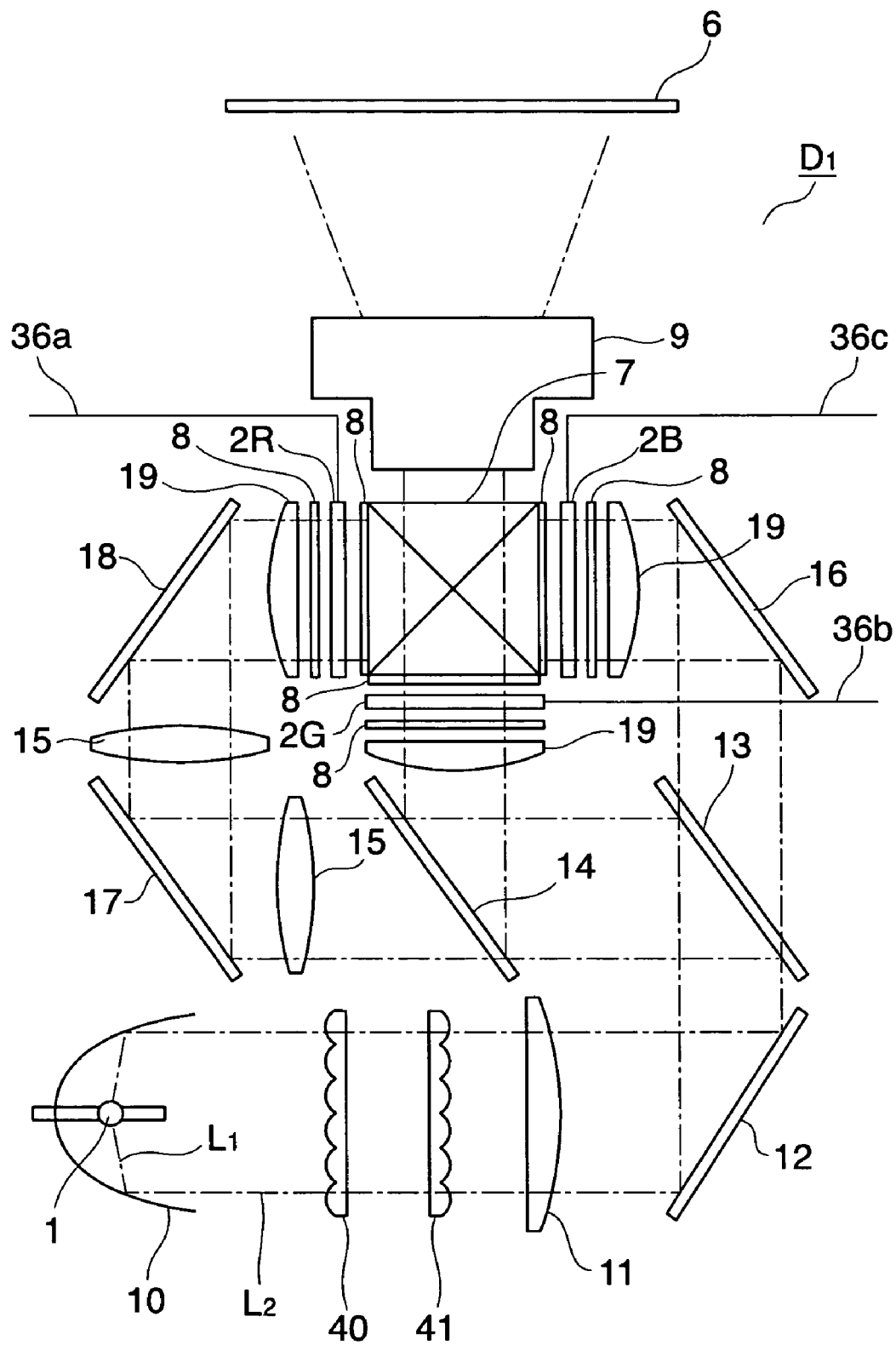
FIG. 2 is an exploded view showing the structure of a projection display engine in FIG. 1.

FIG. 2 is an exploded view showing the structure of the projection display engine D1 shown in FIG. 1

The projection display engine D1 has three liquid crystal panels 2R, 2G, and 2B as optical modulation elements, corresponding to displays in respective colors: R (Red), G (Green), and B (Blue). These three liquid crystal panels 2R, 2G, and 2B are disposed at respective positions opposed to a cross prism 7, and are each comprised of a TN liquid crystal panel driven by means of TFT, for example.

Polarizing plates 8 are placed on the both sides of the respective liquid crystal panels 2R, 2G, and 2B so as to sandwich the respective liquid crystal panels 2R, 2G, and 2B therebetween. A projection lens 9 and the screen (projected member) 6 are disposed on a light exit side of the cross prism 7.

A parabolic reflector 10 is disposed in a fashion surrounding a lamp (light source) 1 to convert light emitted by the lamp 1 into a parallel light beam. It should be noted that the reflector 10 may not be parabolic, but may be ellipsoidal to covert the emitted light into a converged light beam. Moreover, a metal halide lamp or a xenon lamp may be used as the lamp 1.

Fly's eye integrators 40, 41 are provided on the light path of light emitted from the lamp 1 in a conjugate relationship with the liquid crystal panels 2R, 2G, and 2B to reduce non-uniformity of the light source. Moreover, a relay lens 11 and a mirror 12 are provided on the light exit side of the fly's eye integrators 40, 41. Further, two dichroic mirrors 13, 14 are provided to branch the light emitted from the lamp 1 into three beams. The three beams are guided to the respective liquid crystal panels 2R, 2G, and 2B via a relay lens 15 and mirrors 16, 17, and 18. Reference numeral 19 denotes a field lens.

A video signal processing section 3 shown in FIG. 3A, described later, is connected to the liquid crystal panels 2R, 2G, and 2B via signal lines 36a, 36b, and 36c, respectively.

Figure 3A:
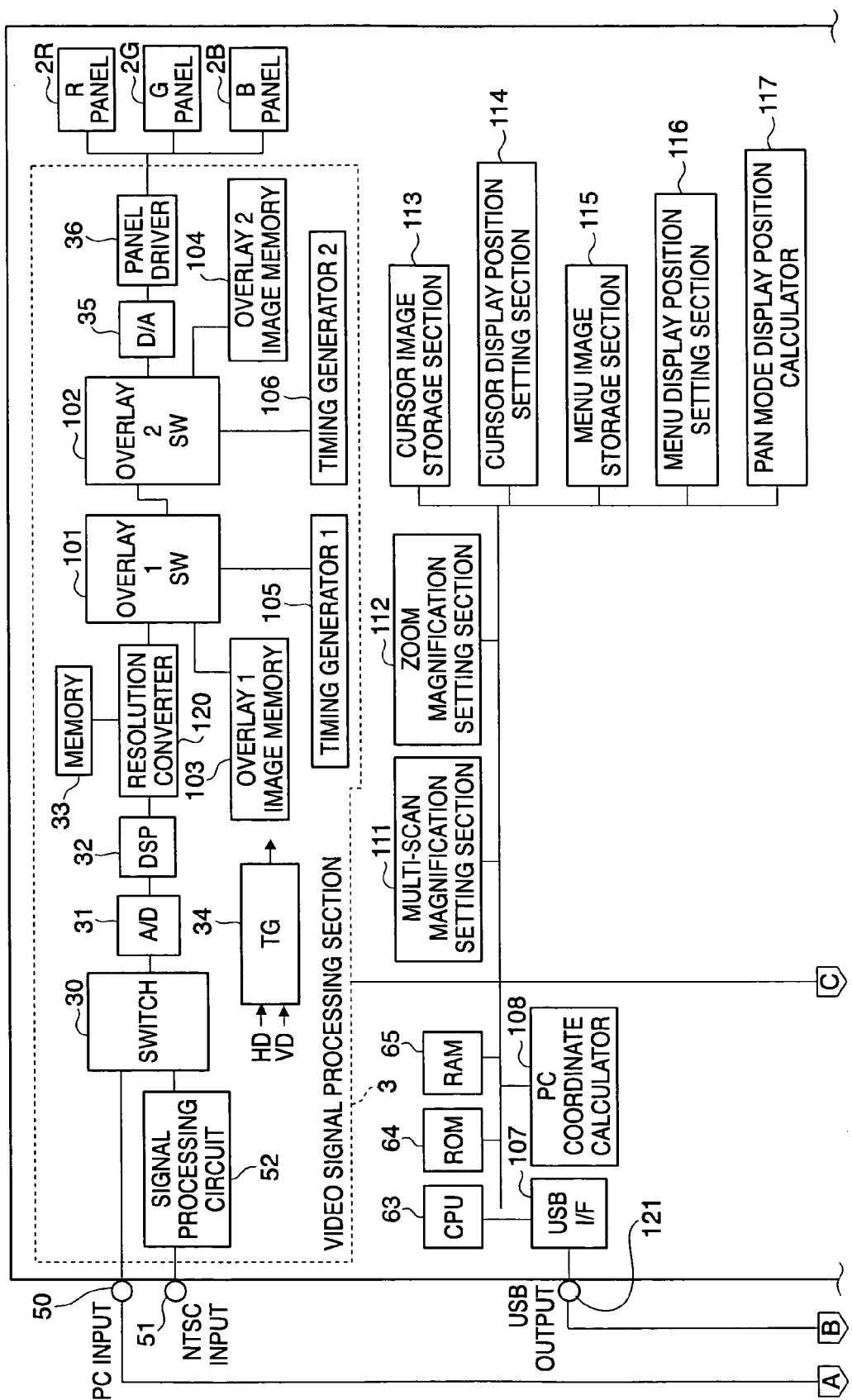

FIGS. 3A and 3B are block diagrams showing the configurations of the display apparatus 200 in FIG. 1 and a PC connected to the display apparatus 200.

The rear projection display apparatus 200 as the display apparatus is comprised of the video signal processing section 3. The video signal processing section 3 is comprised of a switch 30, an A/D converter 31, a DSP (digital signal processor) section which carries out processing such as contrast adjustment, brightness adjustment, and color conversion on images to be displayed, a memory 33 which stores present display data, data to be displayed in the next frame, and the like, a timing generation circuit 34, a resolution converter 120, an overlay 1 switching circuit 101, an overlay 2 switching circuit 102, a timing generator 105 for a menu image display, a timing generator 106 for a cursor display, an overlay 1 image memory 103 which stores an image for the overlay 1, and an overlay 2 image memory 104 which stores an image for the overlay 2.

The video signal processing section 3 is further comprised of a D/A (Digital/Analog) converter 35, a driver circuit 36 which supplies signals to be applied to the respective liquid crystal panels 2R, 2G, and 2B as well as power, a PC input terminal 50, a NTSC input terminal 51, and a signal processing circuit 52 which carries out signal processing such as decoding of a NTSC signal, noise reduction, band limit filtering, and signal level adjustment.

Although only analog input signals are shown in the block diagrams of FIGS. 3A and 3B, the video signal processing section 3 may be further provided with input terminals for the LVDS, TMDS, and others, and a D4 terminal for digital TVs.

Reference numeral 57 denotes a ballast which serves as a power supply used for a lamp, and is connected to the lamp 1; 58, a system power supply; and 60, an AC inlet. Reference numeral 61 denotes a remote controller which is used to operate the display apparatus 200 in various ways, and reference numeral 62 denotes a control panel which receives signals from the remote controller 61. Reference numeral 110 denotes a menu display switch (SW), and reference numeral 109 denotes a menu SW detector which detects operations carried out on the menu display SW 110.

Reference numeral 118 denotes a digitizer detector which detects the coordinates indicated by the digitizer 202. Reference numeral 119 denotes a display coordinate calculator; 111, a multi-scan magnification setting section; 112, a zoom magnification setting section; 113, a cursor image storage section; 114, a cursor display position setting section; 115, a menu image storage section; 116, a menu display position setting section; 117, a pan mode display position calculator; 107, a USB interface (I/F); 108, a PC coordinate calculator; and 121, a USB output terminal.

Reference numeral 63 denotes a CPU; 64, a ROM, and 65, a RAM. Connected to the CPU 63 are the image signal processing section 3, control panel 62, ballast 57, menu SW detector 109, digitizer detector 118, display coordinate calculator 119, multi-scan magnification setting section 111, zoom magnification setting section 112, cursor image storage section 113, cursor display position setting section 114, menu image storage section 115, menu display position setting section 116, pan mode display position calculator 117, USB I/F 107, PC coordinate calculator 108, and others. The CPU 63 carries out drive control of the liquid crystal panels 2R, 2G, and 2B, the lamp 1, and others, zooming in/out and panning of the displayed image, and carries out control of transmission of indications carried out by the digitizer 202 to the PC 300 connected to the display apparatus 200.

The above described components which have been described above as being connected to the CPU 63 may be incorporated in the CPU 63, or may be in the form of program modules executed by a program.

The rear projection display apparatus 200 configured as described above is connected to the PC 300. The PC 300 is comprised of a CPU 301, a HD (Hard Disk) 302, a RAM 303, a ROM 304, a video memory 305, a graphic controller 306, a mouse I/F 307, and a USB I/F 308, and is provided with a video output terminal 309, a USB input terminal 310, and a mouse input terminal 311. Reference numeral 312 denotes a mouse which is connected to the mouse input terminal 311.

A description will now be given of an outline of the operation of the present embodiment.

A video signal output from the PC 300 is input to the display apparatus 200. In the present embodiment, the resolution of the video signal from the PC 300 is 1024 pixels in the horizontal direction by 768 pixels in the vertical direction, which is compliant with the XGA standard. The resolution of the display apparatus 200 is also compliant with the XGA standard, and the raster scan is sequentially carried out from the upper left corner to the lower right corner. The video signal input to the display apparatus 200 is processed to have an image thereof enlarged/reduced to a desired size by the resolution converter 120. The overlay 1 switching circuit 101 carries out image overlay over the image output from the resolution converter 120, and the overlay 2 switching circuit 102 carries out image overlay over the image from the overlay 1 switching circuit 101.

The overlay 1 switching circuit 101 shows a menu used to select enlargement on the image input from the PC 300. When the menu for enlargement is selected using the digitizer pen 203, the transmission of digitizer data to the PC 300 is stopped. Then, the center of an area to be enlarged is clicked by the pen 203, and the area around the center is then displayed on an enlarged scale. When the enlarging process is completed, the display of the enlargement selection menu is returned into the original state. Then, the transmission of the digitizer data to the PC 300 is resumed.

When the display screen (screen 6) showing the enlarged image is operated using the digitizer pen 203, the display coordinate calculator 119 converts the amount of movement or panning or the coordinates into those of the normal image before the enlargement according to the magnification, and the digitizer data is then transmitted to the PC 300. The PC 300 carries out processing based on the transmitted data, and the processed result is thus reflected on the enlarged image of the display apparatus 200.

Then, the enlarged image is panned. When a pan menu displayed by the overlay 1 switching circuit 101 is selected, the display apparatus 200 stops the transmission of the digitizer information to the PC 300.

The zoom menu or the pan menu is then selected, and after the display apparatus 200 is brought into a zoom or pan mode, an operation for the zoom or pan is carried out on the display screen (screen 6). If a mouse signal is transmitted to the PC 300 as a result of the operation, this can cause erroneous operation of the PC 300, and it is thus necessary to control the transmission of the mouse signal to the PC 300. A detailed description will now be given of this control.

As an example, a description will be given of a case where handwriting input software is started on the PC 300, and handwriting input is carried out on the display screen (screen 6) of the display apparatus 200 using the digitizer pen 203. Specifically, the handwriting input software stored in the hard disk 302 is read out and started on the PC 300, and an indication signal generated by the digitizer pen 203 and the digitizer 202 of the display apparatus 200 is then input to the PC 300 via the display apparatus 200, whereby hand-written characters are input. A resolution conversion function of the display apparatus 200 is then used to display an image of the characters on an enlarged scale. The pan function of the display apparatus 200 is then used to pan the displayed enlarged image, and handwriting input is further added to the displayed enlarged image. A detailed description will now be given of the above sequence of operations with reference to FIGS. 4A to 6B.

Figure 4A:
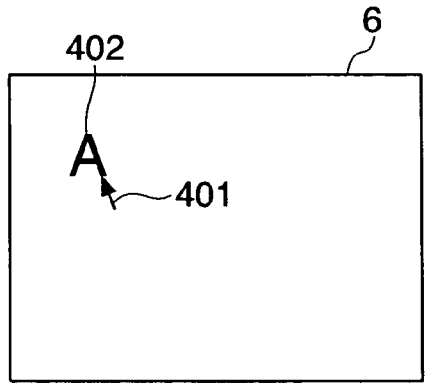
FIGS. 4A to 4D are views useful in explaining display screens showing operations carried out by the display apparatus in FIG. 1.

First, a description will be given of a case where handwriting input is carried out using the digitizer 202 while an overlay such as a menu overlay is not being displayed on the display apparatus 200 with reference to a display example shown in FIG. 4A.

If the overlay display is not being carried out, the digitizer detector 118 detects the coordinates of the indication input (such as pointing or click) carried out by the digitizer pen 203 on the display screen (screen 6). The PC coordinate calculator 108 then carries out coordinate conversion according to the difference between the output resolution of the PC 300 and the display resolution of the display apparatus 200, and the USB I/F 107 converts the indication input (such as pointing or click) and the coordinates into a signal compliant with the USB standard.

The USB signal as a digitizer command is then input to the PC 300 via the USB terminal 121 and the USB input terminal 310 of the PC 300. The USB I/F 308 and the CPU 301 process the digitizer command, and the processing result is used as the mouse signal by the software running on the PC 300. The pointing or the like carried out by the digitizer 202 appears as a mouse cursor 401 on the display screen 6 of the display apparatus 200 as shown in FIG. 4A. Since the mouse 312 is connected to the PC 300, it is set such that a signal from either the digitizer 202 or the mouse 312 which generates a mouse event is used as the mouse signal.

In this state, a character "A" 402 is written using the digitizer pen 203. The display mode of the display apparatus 200 can be changed by selecting any of items on a menu, described later. If the menu item is not being selected, the display apparatus 200 stays in a normal mode, and an indication command input by the digitizer 202 is simply transmitted to the PC 300. As a result, a display in the normal mode appears as shown in FIG. 4A.

Figure 4B:
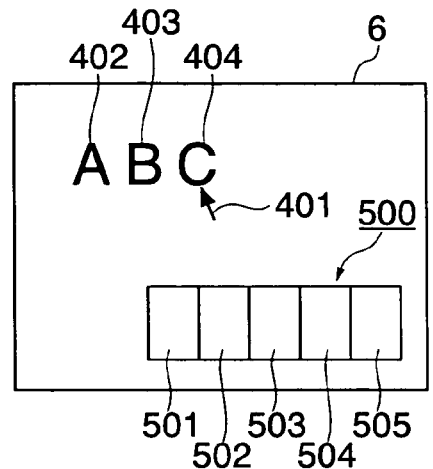

A description will now be given of a case of the overlay display such as the menu display with reference to a display example shown in FIG. 4B.

When the menu display SW 110 of the display apparatus 200 is pressed, the menu SW detector 109 detects that the menu display SW 110 has been pressed. Then, a menu image is read out from the menu image storage section 115, and is stored in the overlay 1 image memory 103. The overlay 1 switching circuit 101 switches to an overlay display of the menu image read out from the overlay 1 image memory 103 based on menu image display coordinates stored in the menu display position setting section 116 in synchronism with a display switching signal generated by the menu image display timing generator 105. In this way, the menu image is displayed as a menu display image 500 on the display screen 6 of the display apparatus 200.

The menu display image 500 is comprised of five images: a zoom-in button 501, a zoom-out button 502, a zoom memory button 503, a pan button 504, and a zoom release button 505. Various functions can be realized on the display apparatus 200 by selecting the images of the buttons 501 to 505.

On this occasion, a character "B" 403 and a character "C" 404 are written on an area other than the menu display image 500 on the display screen 6, using the digitizer pen 203.

The digitizer coordinates generated as these characters 403 and 404 are written are transmitted to the PC 300 via the USB I/F 107. In the PC 300, software running on the PC 300 uses the received coordinates to generate these characters, and the graphic controller 306 transmits the generated characters in an image format compliant with the display apparatus 200 to the display apparatus 200.

The cursor 401 is also synthesized on the PC 300 based on the coordinates transmitted from the display apparatus 200 to the PC 300, and is transmitted to the display apparatus 200 as an element of the screen of the PC 300.

A description will now be given of zooming of the display with reference to FIGS. 4C, 4D, and 5A.

Figure 4C:
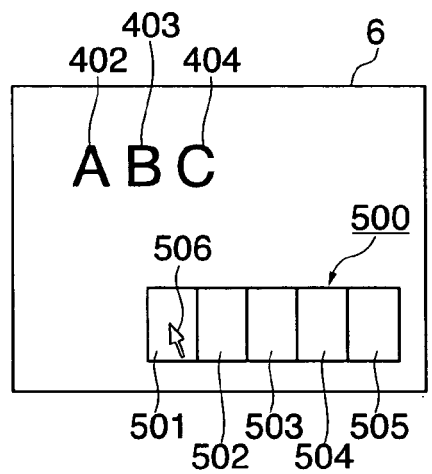
Figure 4D:
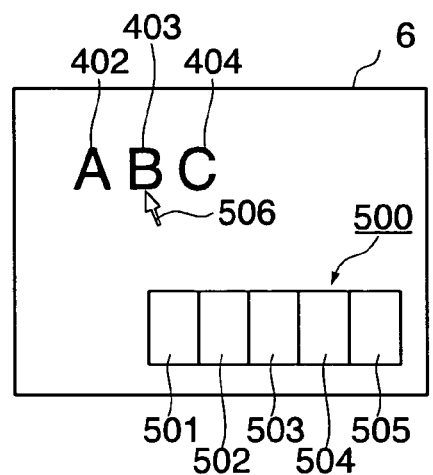
Figure 5A:
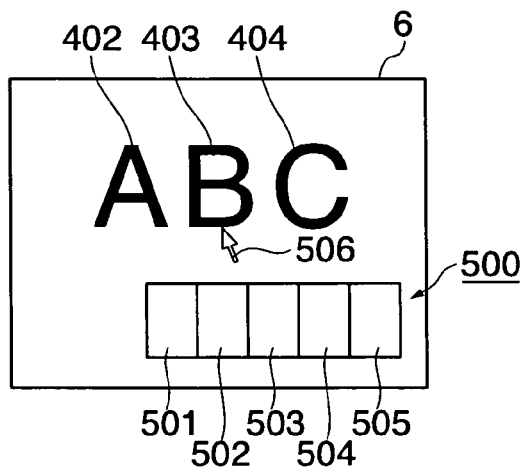
FIGS. 5A to 5C are views showing further display screens displayed by the display apparatus as continuations from FIGS. 4A to 4D.

First, the zoom-in button 501 on the menu display image 500 is clicked by the digitizer pen 203 as shown in FIG. 4C to enlarge the display of the image transmitted from the PC 300 on the display apparatus 200.

Since the overlay 1 switching circuit 101 displays the menu display image 500 over the image transmitted from the PC 300, if an indication by the digitizer pen 203 on the menu display image 500 is transmitted to the PC 300, the PC 300 and the software running on the PC 300 can carry out operations which are not intended by the user. To avoid this, whether an indication by the digitizer pen 203 is being carried out on the menu display image 500 or not is determined based on a result of a comparison between a position indicated by the digitizer pen 203 and information set in the menu display position setting section 116. If the indicated position is within the menu display image 500, no digitizer command is transmitted to the PC 300. On the other hand, if the indicated position is outside the menu display image 500, a digitizer command is transmitted to the PC 300. That is, the information indicating that the zoom-in button 501 has been clicked is not transmitted to the PC 300, and thus a zoom process is carried out by the display apparatus 200.

If the zoom-in button 501 is clicked as shown in FIG. 4C, the display apparatus 200 is brought into a zoom mode, and the display of the cursor 506 is carried out by the overlay 2 switching circuit 102. In the zoom mode, the indication information on an indication by the digitizer 202 is not transmitted to the PC 300. If a center position of an image or the like desired to be zoomed on the display screen 6 is clicked by the digitizer pen 203 as shown in FIG. 4D, the resolution converter 120 is set to a resolution appropriate for the enlargement based on the magnification stored in the zoom magnification setting section 112. In the present embodiment, the image is enlarged by twice in size as shown in FIG. 5A.

A description will now be given of panning of the enlarged image with reference to FIGS. 5B, 5C, and 6A.

Figure 5B:
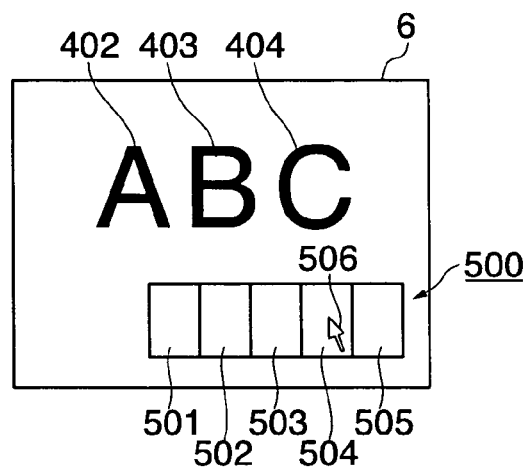
Figure 5C:
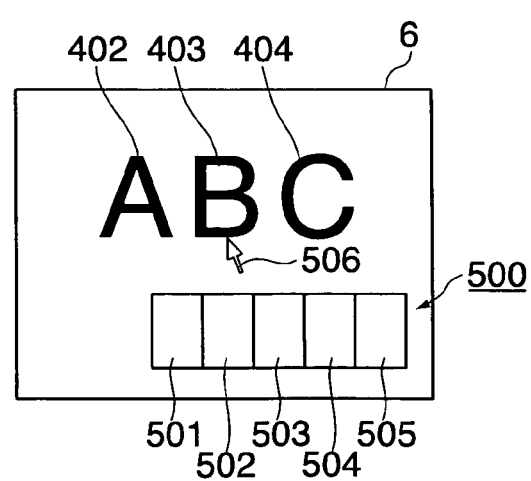
Figure 6A:
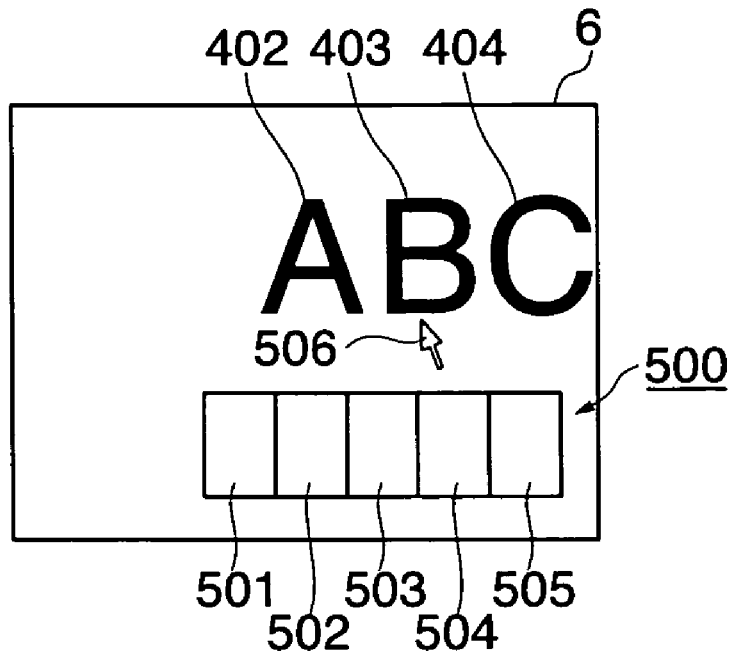
FIGS. 6A and 6B are views showing a further display screens displayed by the display apparatus as continuations from FIGS. 5A to 5C.

The pan button 504 in the menu display image 500 is clicked to pan and display the enlarged image on the display screen 6 as shown in FIG. 5B. The digitizer information on the menu display image 500 acquired by the digitizer 202 is not transmitted to the PC 300, and the cursor display is carried out by the overlay 2 switching circuit 102.

In the pan mode, the digitizer information is not transmitted to the PC 300 irrespective of the position on the display screen 6 at which the cursor 506 is positioned, as in the zoom mode. For example, if the cursor 506 is moved onto the menu display image 500 in the pan mode, since the digitizer information is not transmitted to the PC 300 while the cursor 506 is positioned on the menu display image 500, the cursor generated on the PC 300 is not moved according to the operation carried out by the digitizer 202. Therefore, the cursor image is read out from the overlay 2 image memory 104 in timing generated by the cursor display timing generator 106 based on the digitizer information, and the overlay 2 switching circuit 102 switches the cursor image transmitted from the PC 300 to the read-out cursor image to display the cursor 506.

When the pan button 504 is clicked to bring the display apparatus 200 into the pan mode, the digitizer information is not transmitted to the PC 300, and is used within the display apparatus 200. When the digitizer pen 203 is moved to a panning start position as shown in FIG. 5C, and is then moved with the clicked state maintained, the displayed image can be panned as shown in FIG. 6A. The pan mode display position calculator 117 calculates display position information according to the information on the panning and the magnification, and delivers the calculated display position information to the resolution converter 120. The panning can be finished by releasing the maintained clicked state. For example, the calculation by the pan mode display position calculator 117 is carried out as follows. If the panning is carried out from coordinates (X1, Y1) to coordinates (X2, Y2), the respective panning amounts in the X and Y directions are divided by the magnification to obtain panning amounts ($\Delta X$, $\Delta Y$) by which the original image has been panned as expressed by the following equations (1) and (2):

$$\Delta X = (X2 - X1)/\text{magnification} \quad (1)$$

$$\Delta Y = (Y2 - Y1)/\text{magnification} \quad (2)$$

The pan mode may be released by releasing the maintained click state or clicking the pan button 504 again.

A description will now be given of the handwriting input on the enlarged display screen.

When the process for the enlarged display is carried out, the enlarged display is maintained although the zoom mode is released. When a part of the screen other than the menu display image 500 is operated by the digitizer pen 203 in this state, the digitizer information is transmitted to the PC 300, and the PC 300 and the software running on the PC 300 can thus be operated.

Figure 6B:
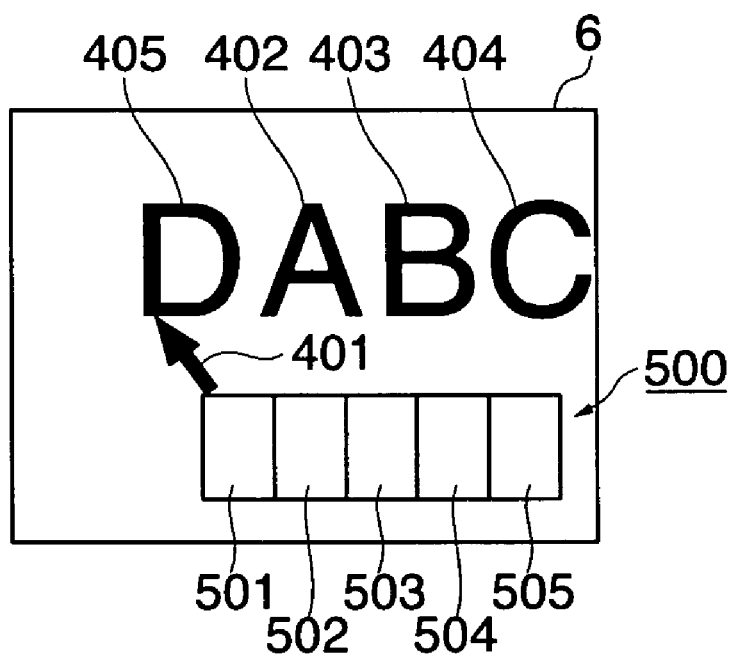

Here, it is assumed that a character "D" is written using the digitizer pen 203 as shown in FIG. 6B.

As described above, whether to transmit the digitizer information to the PC 300 or not is determined depending on whether the cursor 506 is positioned on the menu display image 500 or not, as described above, and it is thus possible to give an indication to the PC 300 while the menu display image 500 is displayed.

According to the present embodiment, even if the digitizer 202 is used to carry out operations for performing various functions provided by the display apparatus 200, this does not cause erroneous operation of the connected PC 300, and further it is possible to operate the PC 300 at the same time. Thus, both the display apparatus 200 and the PC 300 can be operated smoothly without giving a feeling of incompatibility to the user, using a single indicating device (such as the digitizer 202).

Moreover, since the overlay is carried out after the resolution conversion process by the resolution converter 120, the size of the menu does not change even after the enlargement, the position of the menu does not change even after the panning, and enhanced user-friendliness can be provided.

A description will now be given of a method of changing the digitizer coordinates to be transmitted to the PC 300 according to an interpolation method used when the displayed image is enlarged in a second embodiment of the present invention.

In general, when an interpolation for enlarging a displayed image is carried out, it is desirable that the interpolation should be carried out so as to maintain clear edges of characters and the like included in the displayed image to be enlarged. Further, it is desirable that soft filtering should be applied to natural images such as photographs so as for the filtered images to exhibit better appearances. Moreover, also in the case of a natural image, the interpolation should be desirably carried out so as to maintain clear edges of the natural image. It is thus desirable to change the enlargement interpolation method according to the characteristics of an image to be interpolated. When the enlargement interpolation method is changed according to the characteristics of an image, it is desirable to change the coordinates to be transmitted to the PC 300 according to the enlargement interpolation method. A description will now be give of the method of changing the coordinates with reference to FIGS. 7A to 8.

In the present embodiment, a description will be given of a method of carrying out an enlargement interpolation in the horizontal direction, for example. As the enlargement interpolation method, a two-dimensional interpolation may be carried out by applying various methods such as a method which carries out enlargement interpolations in the horizontal and vertical directions at the same time by using a two-dimensional filter or the like, or a method which carries out an interpolation in the horizontal direction, and then carries out an interpolation in the vertical direction.

Figure 7A:
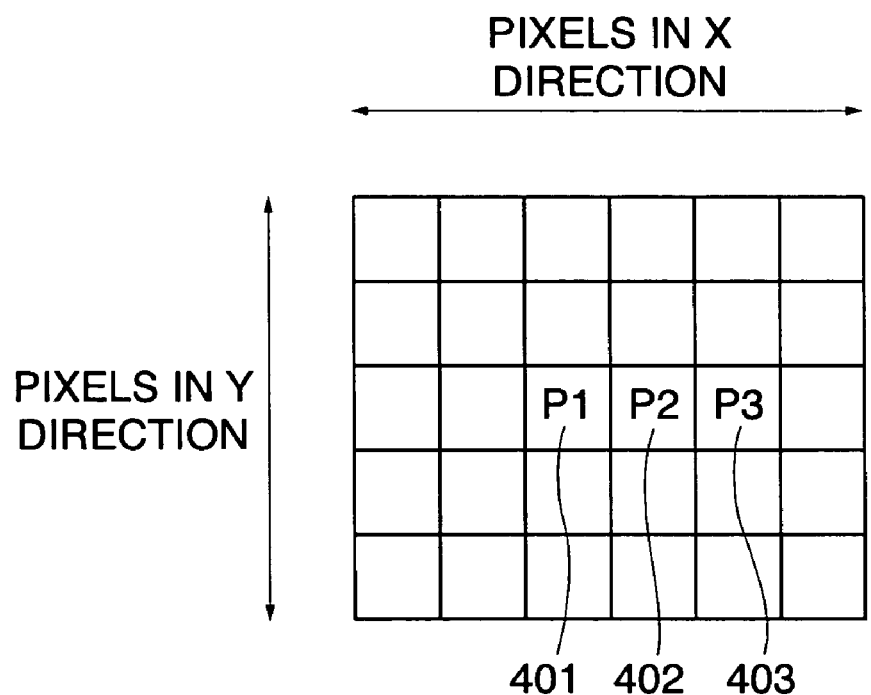
FIG. 7A is a view showing an example of an input image to a display apparatus according to a second embodiment of the present invention.
Figure 7B:
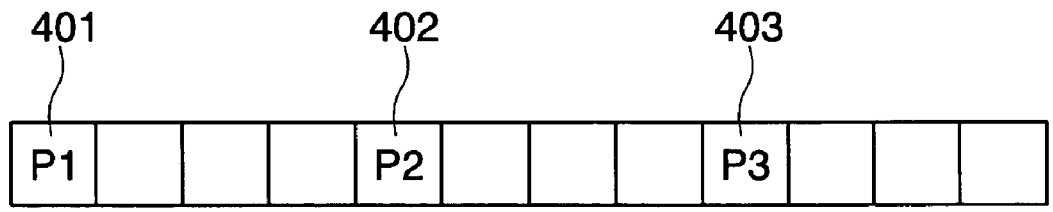
FIG. 7B is a view showing an example of an enlarged part of the input image to the display apparatus according to the second embodiment.

FIG. 7A is a view showing an example of an input image to a display apparatus according to the second embodiment. FIG. 7B is a view showing an example of an enlarged part of the input image to the display apparatus according to the second embodiment.

In FIG. 7A, reference numerals 401, 402, and 403 denote three successive pixels P1, P2, and P3. FIG. 7B shows a state where the part containing these three pixels is enlarged by four times. Namely, the enlargement by four times is carried out by inserting three pixels between the pixels 401 and 402, and between 402 and 403. The values of the three pixels inserted between the original two pixels are determined based on surrounding pixels according to characteristics of the image.

A description will now be given of an enlargement interpolation optimal for characteristics of an image.

Figure 8:
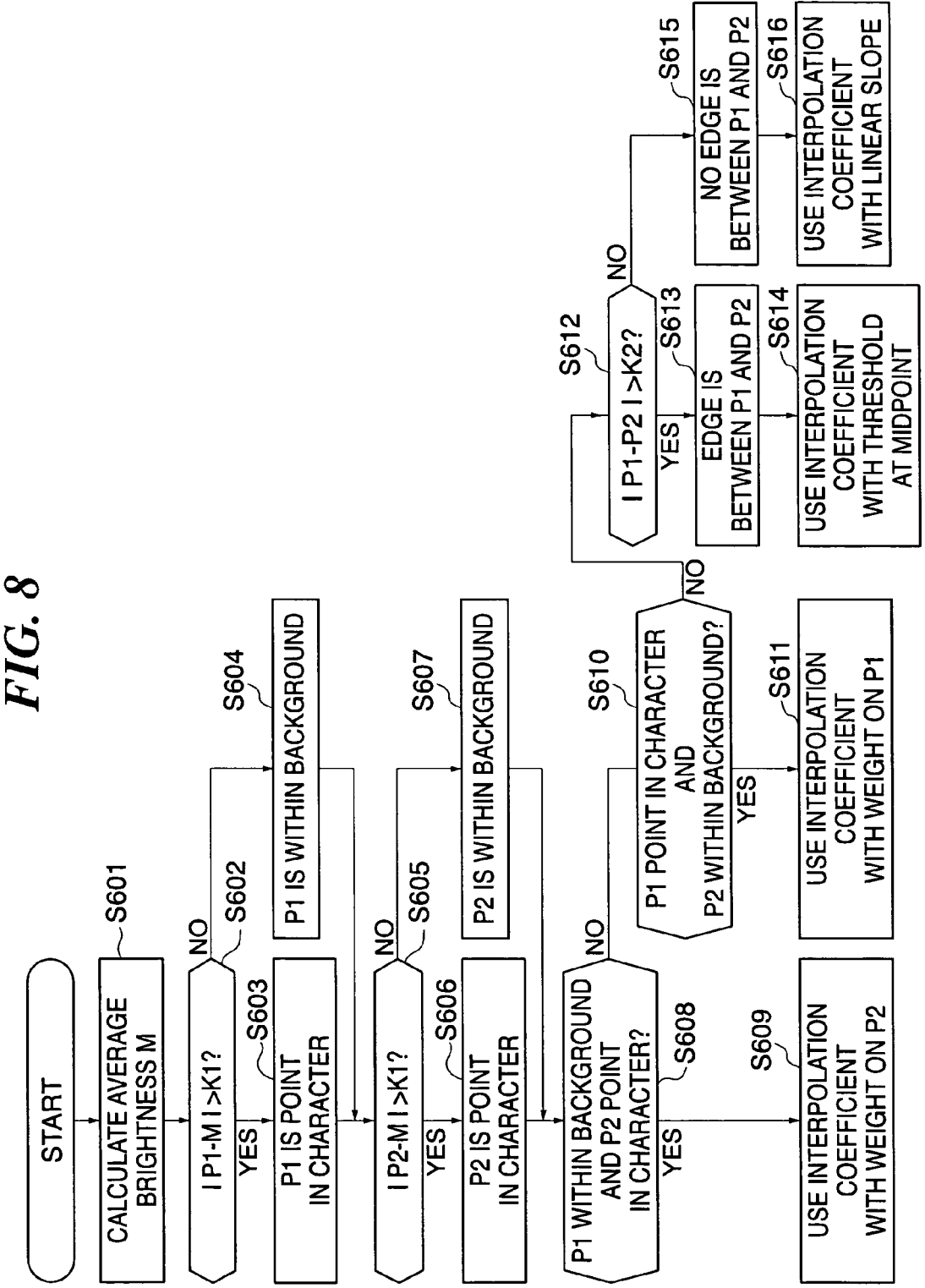
FIG. 8 is a flowchart showing an enlargement interpolation carried out by the display apparatus according to the second embodiment.

FIG. 8 is a flowchart showing the enlargement interpolation carried out by the display apparatus according to the present embodiment. It should be noted that the present enlargement interpolation may be implemented by causing the CPU 63 to execute a program according to the flowchart of FIG. 8 stored in the ROM 64, for example, in the display apparatus 200.

First, a description will be given of an enlargement interpolation method based on detected characteristics of an image. When the interpolation is carried out between the pixels 401 and 402, an average brightness M is obtained on thirty pixels including the pixels 401, 402 and pixels surrounding them as shown in FIG. 7A (step S601). Here, it is assumed that the pixel values of the respective pixels are represented in eight bits capable of displaying 256 gradation levels from 0 (black) to 255 (white). The pixel values of the pixels 401 and 402 are represented respectively as P1 and P2.

It is determined whether the absolute value of the difference between the pixel value P1 of the pixel 401 and the average brightness M is larger than a threshold K1 for characteristic point extraction (step S602). When the difference is larger than the threshold K1, it is determined that the pixel 401 is a characteristic point contained in a character or the like (step S603). When the difference is equal to or smaller, it is determined that the pixel 401 is within a background of the image (step S604). Then, it is determined whether the absolute value of the difference between the pixel value P2 of the pixel 402 and the average brightness M is larger than the threshold K1 for characteristic point extraction (step S605). When the difference is larger than the threshold K1, it is determined that the pixel 402 is a characteristic point contained in a character or the like (step S606). When the difference is equal to or smaller, it is determined that the pixel 402 is within the background of the image (step S607). It is desirable to set the threshold K1 for characteristic point extraction to 150 or more so as to extract a characteristic image such as a character.

A weighting table used for the interpolation between pixels is then selected according to the combination of the respective characteristics of the pixels P1 401 and P2 402.

In weighting tables shown in FIGS. 9A to 10B, the abscissa represents a distance "a" of a pixel subjected to the interpolation from the pixel P1, and the ordinate represents a weighting coefficient h(a) corresponding to the distance "a" measured from the pixel P1. Then, the pixel value A of the pixel subjected to the interpolation is calculated by the following equation (3):

$$A = (\frac{1}{2}) \cdot (P1 \cdot (1 - h(a)) + P2 \cdot h(a)) \quad (3)$$

Figure 9A:
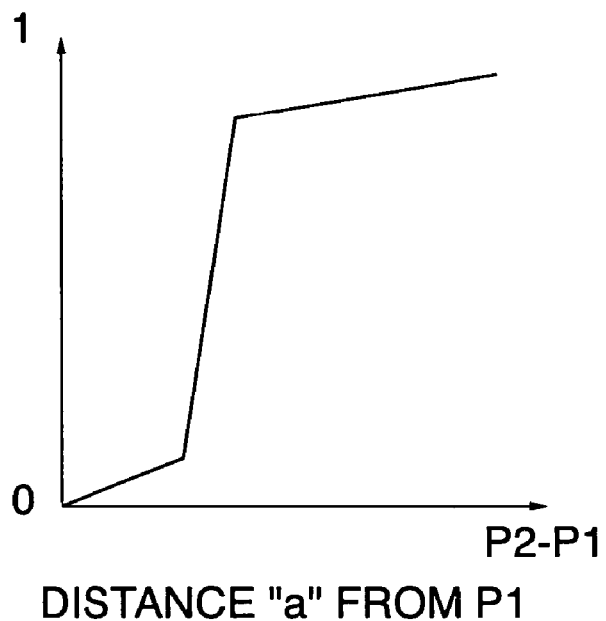
FIGS. 9A and 9B are views showing weighting tables for use in the display apparatus according to the second embodiment.
Figure 9B:
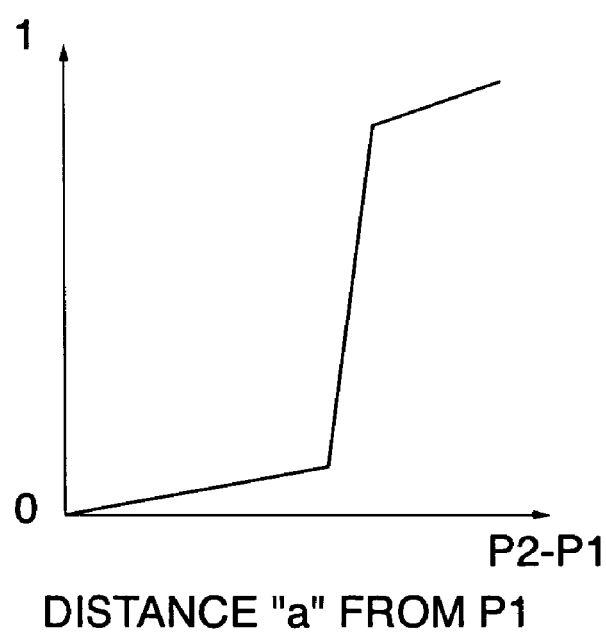

When the pixel P1 is contained in the background, and the pixel P2 is a characteristic image (step S608), a weighting table which puts a more weight on the pixel P2 as shown in FIG. 9A is used (step S609). When the pixel P1 is a characteristic image and the pixel P2 is contained in the background (step S610), a weighting table which puts a more weight on the pixel P1 as shown in FIG. 9B is used (step S611).

In the other cases where both the pixels P1 and P2 have the same characteristics, a weighting table is selected according to whether there exists an edge between the pixels P1 and P2 or not (step S612). This determination is carried out based on whether the absolute value of the difference between the respective pixel values of the pixels P1 and P2 is larger than a threshold K2 for edge determination or not. It is desirable to set the threshold K2 for edge determination to 100 or more so as to properly detect an edge. It is also possible to change the threshold K2 for edge determination according to the pixel values of a plurality of surrounding pixels. With this configuration, it is possible to detect a weak edge correctly.

Figure 10A:
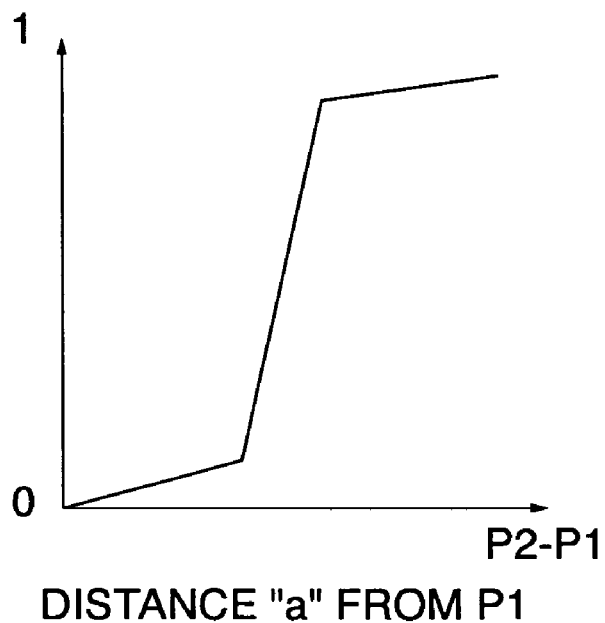
FIGS. 10A and 10B are views showing other weighting tables for use in the display apparatus according to the second embodiment.
Figure 10B:
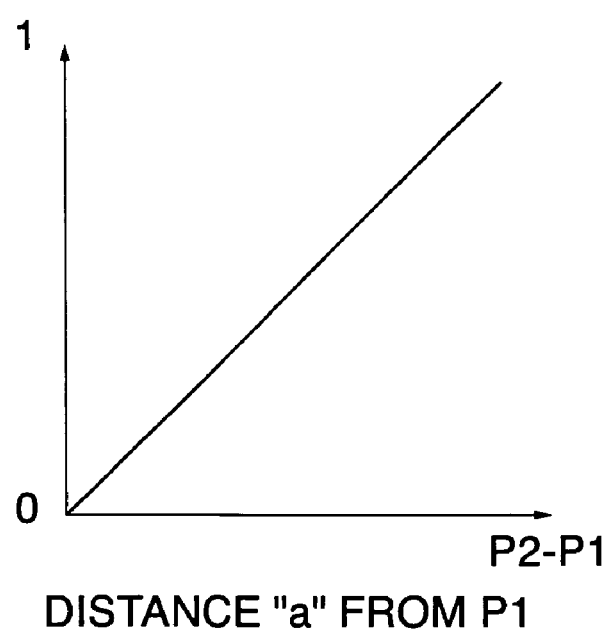

When the absolute value of the difference between the respective pixel values of the pixels P1 and P2 is larger than the threshold K2 for edge determination, it is determined that there exists an edge between the pixels P1 and P2 (step S613), and a weighting table in FIG. 10A which has a threshold between the pixels P1 and P2 is used (step S614). When the absolute value of the difference between the respective pixel values of the pixels P1 and P2 is equal to or smaller than the threshold K2 for edge determination, it is determined that there is no edge between the pixels P1 and P2 (step S615), and a weighting table in FIG. 10B which has a linear slope between the pixels P1 and P2 is used (step S616).

The above interpolation process can provide an enlargement interpolation optimal for the characteristics of an image.

A description will now be given of a method of converting the digitizer information to be transmitted to the PC 300 according to the enlargement interpolation method.

When position coordinates (x, y) are acquired by the digitizer 202, it is possible to obtain the original coordinates before the enlargement by dividing the position coordinates by the magnification of the enlargement. For example, when the coordinates of the digitizer are (362, 463) and the magnification is 4, the original X coordinate is 362/4=90+0.5, which means that the interpolation has been carried out between the original X coordinates 90 and 91 before the enlargement. The original Y coordinate can be obtained in the same way. In this case, when this is applied to the above described enlargement interpolation method in the horizontal direction, the result is represented as: pixel value of P1=90, pixel value of P2=91, and distance from P1 a=0.5.

The image data is read out from the memory 33 based on the coordinate value of the pixel P1, the average brightness M is calculated, and a weighting coefficient table fh(a) is calculated according to the enlargement interpolation process shown in FIG. 8. The weighting coefficient h(0.5) is obtained by setting the value "a" of the weighting coefficient h(a) to 0.5 (a=0.5). The weighting coefficient h(0.5) is compared with a threshold K3. If the weighting coefficient h(0.5) is larger than the threshold K3, the coordinates of the pixel P2 are used as the digitizer coordinates. If the weighting coefficient h(0.5) is equal to or smaller than the threshold K3, the coordinates of the pixel P1 are used as the digitizer coordinates. The threshold K3 is set to 0.5, which is the middle value of the weighting coefficient, and may be changed according to characteristics of the display apparatus and the displayed image.

In this way, in the present embodiment, the digitizer coordinates can be changed according to the type of the enlargement interpolation method.

As described above, according to the present embodiment, an image input from the PC 300 to the display apparatus 200 is enlarged/reduced by the display apparatus 200, and a position on the display screen 6 of the display apparatus 200 is then indicated by the digitizer 202, for example, to give an instruction to the display apparatus 200 or the PC 300. In this case, the image is displayed using the enlargement interpolation method (resolution conversion method) suitable for the characteristics of the image, and the digitizer information (indication signal) is converted according to the enlargement interpolation method, and then is output to the PC 300. As a result, it is possible to give an instruction suitable for the image subjected to the enlargement interpolation, thereby preventing an erroneous operation of the instructed object, as well as display of the indicated image at an incorrect position and hence avoiding a feeling of incompatibility from being given to the user.

Although in the above embodiments, the menu display switch (SW) 110 is provided on the display apparatus 200, the menu display switch may be provided on the remote controller 61 such that the remote controller 61 transmits commands for starting or terminating the menu display to the display apparatus 200.

Although in the above embodiments, the digitizer 202 is mounted on the display screen 6, an indicating device such as a mouse may be connected to the display apparatus 200, providing similar effects.

Although in the above embodiments, the rear projection display apparatus 200 is used as an example, the display apparatus may be any type insofar as a digitizer can be used, such as PDP, LCD, CRT, and a front projector type.

The indication information may include indication information indicated by a remote controller. Then, a usage similar to that is provided by the digitizer can be achieved, resulting in enhanced user-friendliness.

A selection signal generated by a click on the menu display image 500 may be converted to a pointing command, and the pointing command may be transmitted to the PC 300. In this case, the cursor displayed by the PC 300 may be hidden under the menu display image 500. The use of such a pointing command does not cause any adverse effects such as an erroneous operation of the PC 300.

Although in the above embodiments, the indication signal is not transmitted to the PC 300 in the pan mode and the zoom mode a selection signal generated by a click or a drag signal may be converted to a pointing command, and the pointing command may be transmitted to the PC 300, to thereby display a cursor generated by the PC 300. In this case as well, the use of the pointing command converted from the selection signal or the drag signal does not cause an erroneous operation of the PC 300.

Although in the above embodiments, an edge is detected based on the difference between the pixel values of neighboring two pixels, there may used a method which determines an edge based on a deviation from an approximated curve generated from several neighboring pixels.

The present invention is not limited to the apparatuses according to the above embodiments, and may either be applied to a system composed of a plurality of apparatuses or to a single apparatus.

It is to be understood that the object of the present invention may also be accomplished by supplying a system or an apparatus with a storage medium in which a program code of software which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-083351 filed Mar. 22, 2004, which is hereby incorporated by reference herein.

What is claimed is:

1. A display apparatus that receives an image signal from an image output apparatus, and displays an image at a predetermined resolution, comprising:
    an image signal characteristics detecting device that detects characteristics of the received image signal,
    a display device that selects one resolution conversion method from a plurality of resolution conversion methods according to the detected characteristics of the image signal, converts resolution of the received image signal according to the selected resolution conversion method, and displays the converted image on a display screen;
    an indicating device that generates an indication signal containing position coordinates on the display screen and at least one type of indication command according to an indication carried out on the displayed image;
    an indication signal conversion device that converts the indication signal according to the position coordinates contained in the indication signal; and
    an indication signal output device that outputs the converted indication signal to the image output apparatus,
    wherein said indication signal conversion device converts the position coordinates of the image signal according to the selected resolution conversion method.

2. A display apparatus as claimed in claim 1, wherein said indication signal conversion device converts position information indicated by the indication signal according to the position coordinates contained in the indication signal.

3. A display apparatus as claimed in claim 1, wherein said indication signal conversion device converts a type of the indication command contained in the indication signal according to the position coordinates contained in the indication signal.

4. A display apparatus as claimed in claim 1, wherein said indication signal conversion device converts position information indicated by the indication signal according to a type of the indication command contained in the indication signal.

5. A display apparatus as claimed in claim 1, wherein said indication signal conversion device converts position information indicated by the indication signal according to an interpolation method used for enlargement of the displayed image.

6. A display apparatus as claimed in claim 1, wherein:
    said indicating device comprises a display mode switching device that switches between a plurality of display modes according to the position coordinates of the output image from said display device; and
    said indication signal conversion device converts the indication signal according to one of the display modes selected by the switching.

7. A display apparatus as claimed in claim 6, wherein said indication signal conversion device converts a signal generated by a click as the indication signal to a pointing signal when the display mode selected by the switching is a pan mode for panning the displayed image or a zoom mode for zooming the displayed image.

8. A display apparatus as claimed in claim 7, wherein:
said display switching device comprises:
a first switching device that switches the output image to a first image, and outputs the first image; and
a second switching device that switches the output first image to a second image, and outputs the second image.

9. A control method for a display apparatus that receives an image signal from an image output apparatus, and displays an image at a predetermined resolution, comprising:
an image signal characteristics detecting step of detects characteristics of the received image signal;
a display step of selects one resolution conversion method from a plurality of the resolution conversion methods according to the detected characteristics of the image signal, converts resolution of the received image signal according to the selected resolution conversion method, and displays the converted image on a display screen;
an indicating step of generating an indication signal containing position coordinates on the display screen and at least one type of indication command according to an indication carried out on the displayed image;
an indication signal conversion step of converting the indication signal according to the position coordinates contained in the indication signal; and
an indication signal output step of outputting the converted indication signal to the image output apparatus,
wherein said indication signal conversion step converts the position coordinates of the image signal according to the selected resolution conversion method.

10. A computer-readable storage medium encoded with a control program for implementing a control method for a display apparatus that receives an image signal from an image output apparatus, and displays an image at a predetermined resolution, comprising:
an image signal characteristics detecting module for detects characteristics of the received image signal,
a display module for selects one resolution conversion method from a plurality of resolution conversion methods according to the detected characteristics of the image signal, converts resolution of the received image signal according to the selected resolution conversion method, and displays the converted image on a display screen;
an indicating module for generating an indication signal containing position coordinates on the display screen and at least one type of indication command according to an indication carried out on the displayed image;
an indication signal conversion module for converting the indication signal according to the position coordinates contained in the indication signal; and
an indication signal output module for outputting the converted indication signal to the image output apparatus,
wherein said indication signal conversion module converts the position coordinates of the image signal according to the selected resolution conversion method.

11. A display apparatus as claimed in claim 1, further comprising a display switching device that carries out switching on the output image and displays an image after the switching on a display screen.

12. A control method as claimed in claim 9, further comprising a display switching step of carrying out switching on the output image and displaying an image after the switching on a display screen.

13. A control method as claimed in claim 9, wherein said indication signal conversion step converts position information indicated by the indication signal according to the position coordinates contained in the indication signal.

14. A control method as claimed in claim 9, wherein said indication signal conversion step converts a type of the indication command contained in the indication signal according to the position coordinates contained in the indication signal.

15. A control method as claimed in claim 9, wherein said indication signal conversion step converts position information indicated by the indication signal according to a type of the indication command contained in the indication signal.

16. A control method as claimed in claim 9, wherein said indication signal conversion step converts position information indicated by the indication signal according to an interpolation method used for enlargement of the displayed image.

17. A computer-readable storage medium as claimed in claim 10, wherein the control program further includes a display switching module for carrying out switching on the output image and displaying an image after the switching on a display screen.

18. A computer-readable storage medium as claimed in claim 10, wherein said indication signal conversion module converts position information indicated by the indication signal according to the position coordinates contained in the indication signal.

19. A computer-readable storage medium as claimed in claim 10, wherein said indication signal conversion module converts a type of the indication command contained in the indication signal according to the position coordinates contained in the indication signal.

20. A computer-readable storage medium as claimed in claim 10, wherein said indication signal conversion module converts position information indicated by the indication signal according to a type of the indication command contained in the indication signal.

* * * * *